(12) United States Patent
Budd

(10) Patent No.: US 7,266,420 B2
(45) Date of Patent: Sep. 4, 2007

(54) AUTOMATIC DETECTION SYSTEM FOR BROKEN TOOLS IN CNC MACHINING CENTERS USING ADVANCED MACHINE VISION TECHNIQUES

(76) Inventor: Gerald Walter Budd, 36853 Heatherton Rd., Farmington, MI (US) 48335

( * ) Notice: Subject to any disclaimer, the term of this patent is extended or adjusted under 35 U.S.C. 154(b) by 51 days.

(21) Appl. No.: 11/097,437

(22) Filed: Apr. 2, 2005

(65) Prior Publication Data

US 2005/0222705 A1  Oct. 6, 2005

Related U.S. Application Data

(60) Provisional application No. 60/558,897, filed on Apr. 3, 2004.

(51) Int. Cl.
*G06F 19/00* (2006.01)
*G06K 9/00* (2006.01)

(52) U.S. Cl. .................. 700/175; 700/95; 700/159; 382/152

(58) Field of Classification Search ........... 700/175, 700/90, 95, 117, 159, 195, 174; 382/152
See application file for complete search history.

(56) References Cited

U.S. PATENT DOCUMENTS

| 5,361,308 | A | * | 11/1994 | Lee et al. | 382/204 |
| 5,768,138 | A | * | 6/1998 | Ruotolo | 700/186 |
| 5,904,457 | A | * | 5/1999 | Suwijn et al. | 409/1 |
| 6,323,776 | B1 | * | 11/2001 | Jackson et al. | 340/679 |
| 6,621,928 | B1 | * | 9/2003 | Inagaki et al. | 382/199 |
| 7,010,386 | B2 | * | 3/2006 | McDonnell et al. | 700/175 |
| 2004/0066964 | A1 | * | 4/2004 | Neubauer et al. | 382/152 |
| 2005/0213807 | A1 | * | 9/2005 | Wasserman | 382/152 |

* cited by examiner

*Primary Examiner*—Alexander Kosowski

(57) ABSTRACT

The invention describes a method for the inspection of machining tools used in computational numerical control (CNC) machining centers. The invention will observe a machining tool immediately after use to determine if it has been damaged. The invention is based on a machine vision technology that uses one or more image sensors to acquire, locate and compare the tool to a good model. The inspection equipment is designed for implementation in the CNC automatic tool changing system and will alert the operator that tool has been damaged before the next operation. This immediate response of the invention will contain defect components and prevent damage to subsequent components. With the addition of an infrared image sensor the invention is capable of detecting worn or dull tools that may damage a component due to excessive heating.

11 Claims, 6 Drawing Sheets

Side Profile View Back View

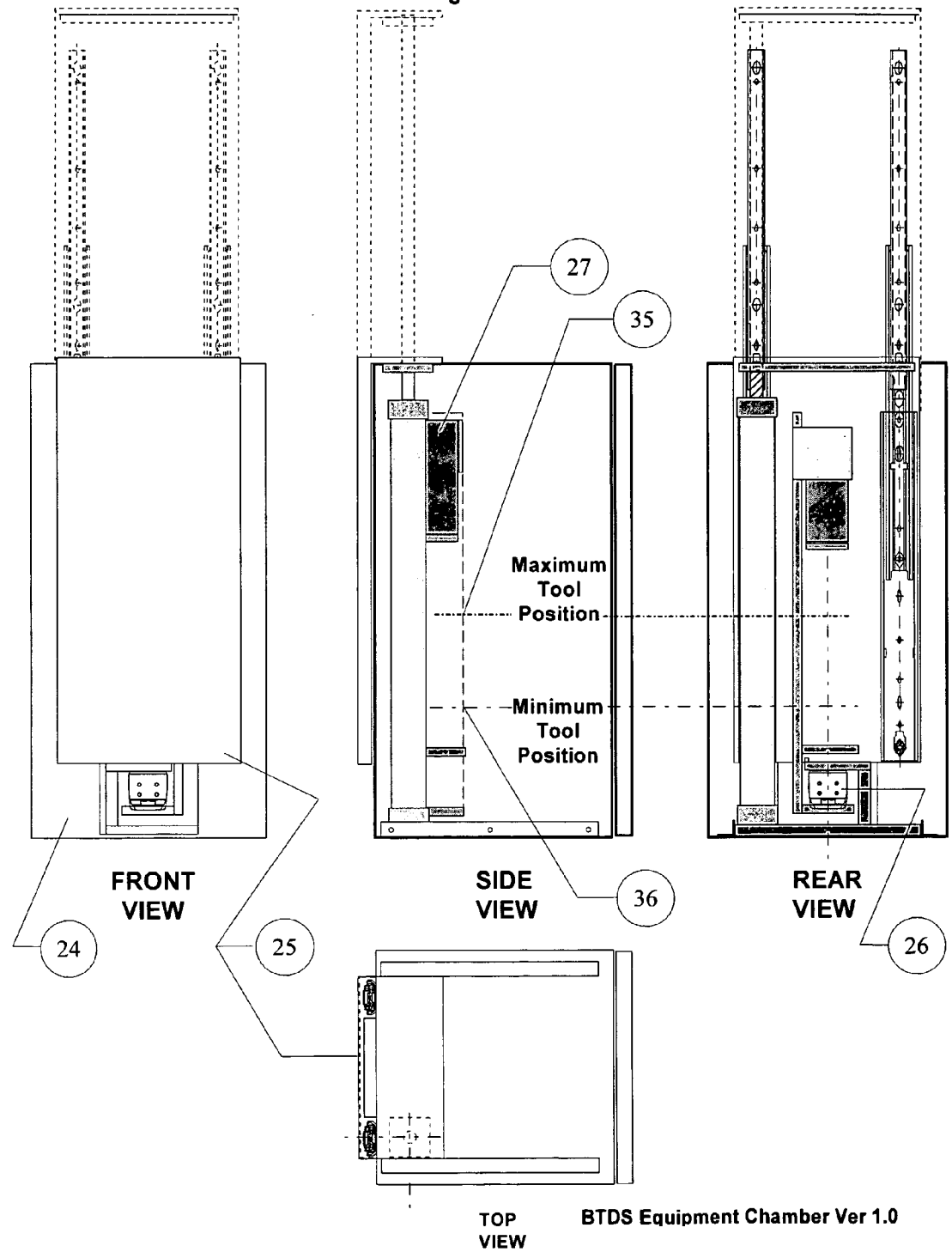

AUTOMATIC DETECTION SYSTEM FOR BROKEN TOOLS IN CNC MACHINING CENTERS USING ADVANCED MACHINE VISION TECHNIQUES

CROSS-REFERENCE TO RELATED APPLICATIONS

I claim priority to my Provisional Application No. 60/558,897 with filing date Apr. 3, 2004.

DESCRIPTION

FIELD OF THE INVENTION

This invention relates to the procedures and devices utilized in the inspection of machining tools used in computational numerical control (CNC) machining centers and as an aid for the setup of the machining tools.

BACKGROUND OF THE INVENTION

The CNC machining center technology used today has increased the production of complex components significantly. The CNC machining centers can perform 5 and 6 axis operations a very high speed. One of the most important improvements made to the technology in recent years is the automatic tool changing system. This system allows the CNC machining center to retrieve a specific tool for each operation without intervention from an operator. The advent of this technology allows one operator to setup and service several CNC machining centers, thus reducing plant operational cost.

Tool monitoring is a remedy for the unattended machining environment. Large and small facilities are continuously pursuing "lights out" production periods, reducing or eliminating the need for line operators. Error proofing is essential when considering savings opportunities with respect to labor sorting costs. One hundred percent manual (human) inspection is only 80 percent reliable, per automotive supplier quality specialists.

A major drawback with the use of automatic tool changing technology is that fact that a machine will continue to function with a defective tool. There have been several attempts to incorporate technology that will detect broken and worn tools. However the attempts have proven to be unreliable and difficult to maintain. The most popular techniques attempted include the use of laser detectors; photoelectric detectors, mechanical touch probes, and torque monitoring for spindle motors. Laser detectors, photoelectric detectors and mechanical probe fail to detect defective tools when they are chipped or cracked. Motor torque monitors usually detect only catastrophic modes of tool failures. CCD camera technology has been applied to tool setup but has been limited to off-line applications only.

The proposed invention provides an added level of security in that the measurement technique is not limited to single feature. This invention also allows the user to implement the system on all type of machine cutting tools, including drills, taps, multiple tool holders, surface cutters, and unusual shaped cutters. The invention is based on a machine vision system with compact sensors and solid state illumination capable of withstanding harsh machining center environments.

BRIEF SUMMARY OF THE INVENTION

The invention describes a method for the inspection of machining tools used in computational numerical control (CNC) machining centers. The invention will observe a machining tool immediately after use to determine if it has been damaged. The invention is based on a machine vision technology that uses one or more image sensors to acquire, locate and compare the tool to a good model. The inspection equipment is designed for implementation in the CNC automatic tool changing system and will alert the operator that tool has been damaged before the next operation. This immediate response of the invention will contain defect components and prevent damage to subsequent components. With the addition of an infrared image sensor the invention is capable of detecting worn or dull tools that may damage a component due to excessive heating.

It is an object of the present invention to transform the present probabilistic detection of broken or damaged CNC machine tools, into a deterministic detection and accurate measurement process.

It is a further object of the present invention to provide a method to generate a uniform illumination field within the CNC machining center to enhance the detection and measurement of machine tools characteristics.

It is a further object of the present invention to provide a method that evaluates the focused or nearly focused image of the machining tools with a direct, two-dimensional mapping of the machining tool physical characteristics in a defined area.

It is a further object of the present invention to provide a method to acquire image(s) of machining tools in the operating environment of CNC machining center immediately after removal or prior to insertion into the storage of the automatic tool changing system.

It is a still further object of the present invention to provide a method that will allow the replacement of broken, dull or worn tools with new tools in the proper position in the tool holder.

It is yet another object of the present invention to provide a means for the construction of an instrument that can be retrofit into existing CNC machining centers or added to new systems.

Generally the present invention, comprises an improved method for the substantially complete detection of all damaged machining tools, within a predetermined size range, held in a tool holder, in a fixed inspection position within the confines of CNC machining center with an automatic tool changer. In preferred embodiments the tool holder is held in a repeatable position when presented to the sensor, though different machining tools (shape and size) may have a different end point from the tool holder reference position. Hereafter the present invention will be referred to as the "Broken Tool Detection System" or BTDS. The method for proper use of the BTDS comprises the steps of:

a) pre-positioning the tool holder with machining tools mounted in the cutting position in an inspection position in the machining center whereby the positioning of the machining tool exposes substantially all of the features that are to be evaluated by the inspection;

b) the CNC machining center provides a signal(s) to the present invention, referred to hereafter as the Broken Tool Detection System (or BTDS), indicating a unique code for the tool that is to be inspected;

c) the cell controller or programmable logic controller (PLC) of the BTDS distributes the inspection request to the primary devices that present invention is comprised of and awaits acknowledgement signal(s);

d) the BTDS opens equipment chamber pneumatically operated lift door;

e) the image sensor and illumination system are mounted on a bracket that holds their orientation and position to each other in a fixed position (Optical Sensor), with the bracket in turn mounted to a translation stage;

f) the translation stage moves the optical sensor to the proper inspection position as determined by the product code so that substantially all of the features to be inspected are visible and unobstructed to the optical sensor;

g) the illumination system is energized and the optical sensor acquires the necessary image(s), the illumination is extinguished and then the translation stage returns to the interior of the equipment chamber and the pneumatically operated lift door is closed;

h) one or more image processing systems and application specific software is used to determine the condition of the machining tools;

i) the BTDS distributes the inspection results to the CNC machining center.

wherein the sensed signal is corrected for the asymmetries of the imaging system by correction means either by computation or by repositioning the detector means relative to the machining tool, whereby a focused imaging plane is formed at the tool axis and then mechanically or electro-mechanically offset, whereby the size of is accurately mathematically compensatible to an actual size. The lighting means provides a multiplicity of directed light emitting diodes (LED's), mounted in a sealed metal container with an diffusing element placed in front of the LED's and the light emitting surface perpendicular to the optical axis of the BTDS. The length and width of the diffusing element should be at least 3.0 times the diameter of the tool being inspected. The lighting means may be adjusted to enhance the image characteristics by adjusting the voltage powering the LED lighting elements within the structure.

With said detector being mounted inside a sealed enclosure the critical optical components of the system can be protected from the environment. The detector is mounted in such a manner so that so that the optical path can be easily adjusted with the target area. The design of the sensor enclosure allows for the insertion of optical filter elements within the optical path of the invention. The translation stage is selected such that it has sufficient translation capability (travel) to allow the optical components (sensor and illumination) to view the shortest of the machining tools.

These and other objects, features and advantages of the present invention will become more evident from the following discussion and drawings in which:

BRIEF DESCRIPTION OF THE SEVERAL VIEWS OF THE DRAWINGS

FIG. 6 illustrates the interior and exterior configuration of the equipment chamber and relative position of key components;

DETAILED DESCRIPTION OF THE INVENTION

Figure 1:
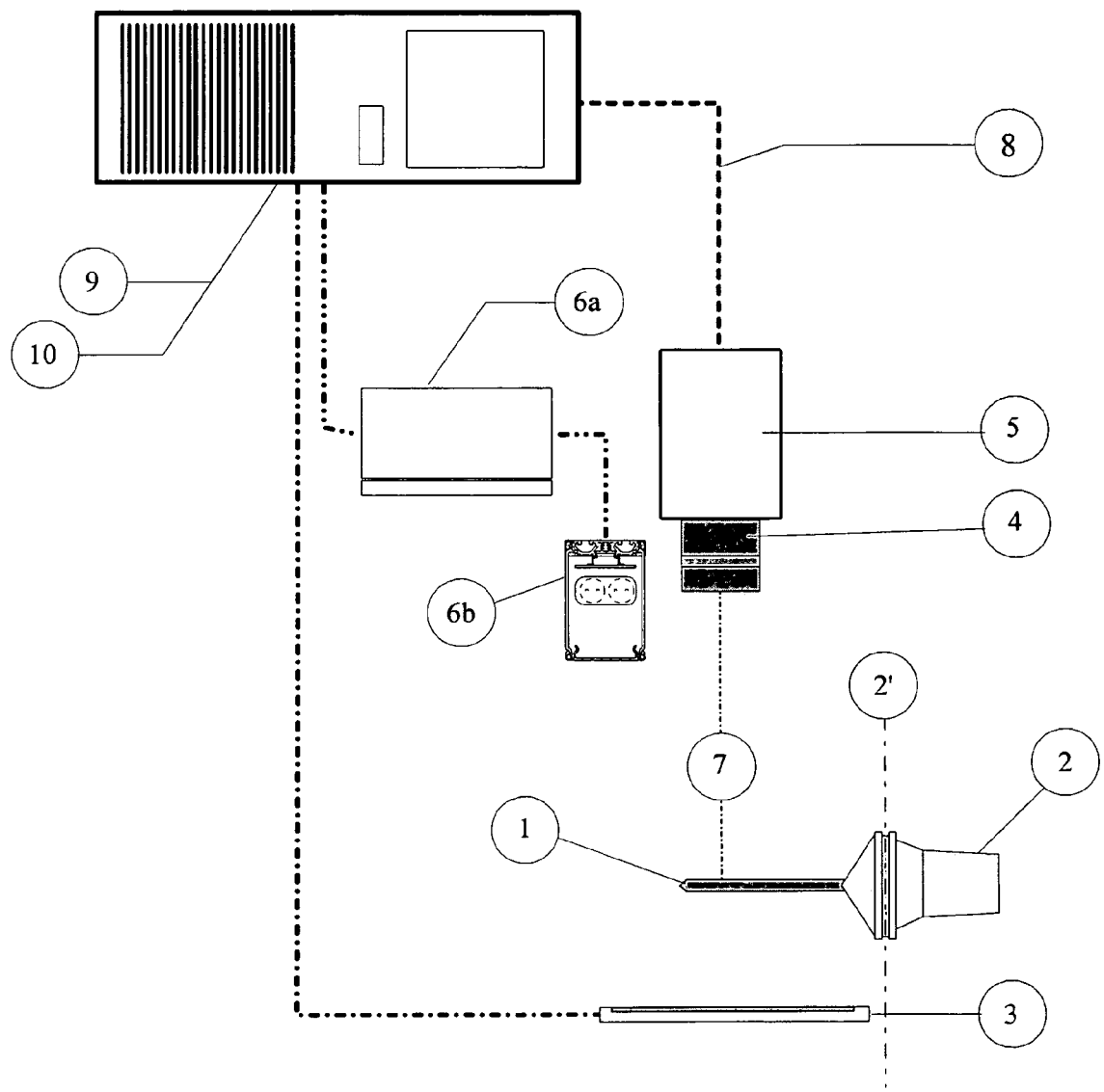
FIG. 1 illustrates the key components of the invention in its most basic form using an LED backlight and fluorescent front lighting system.
Figure 2:
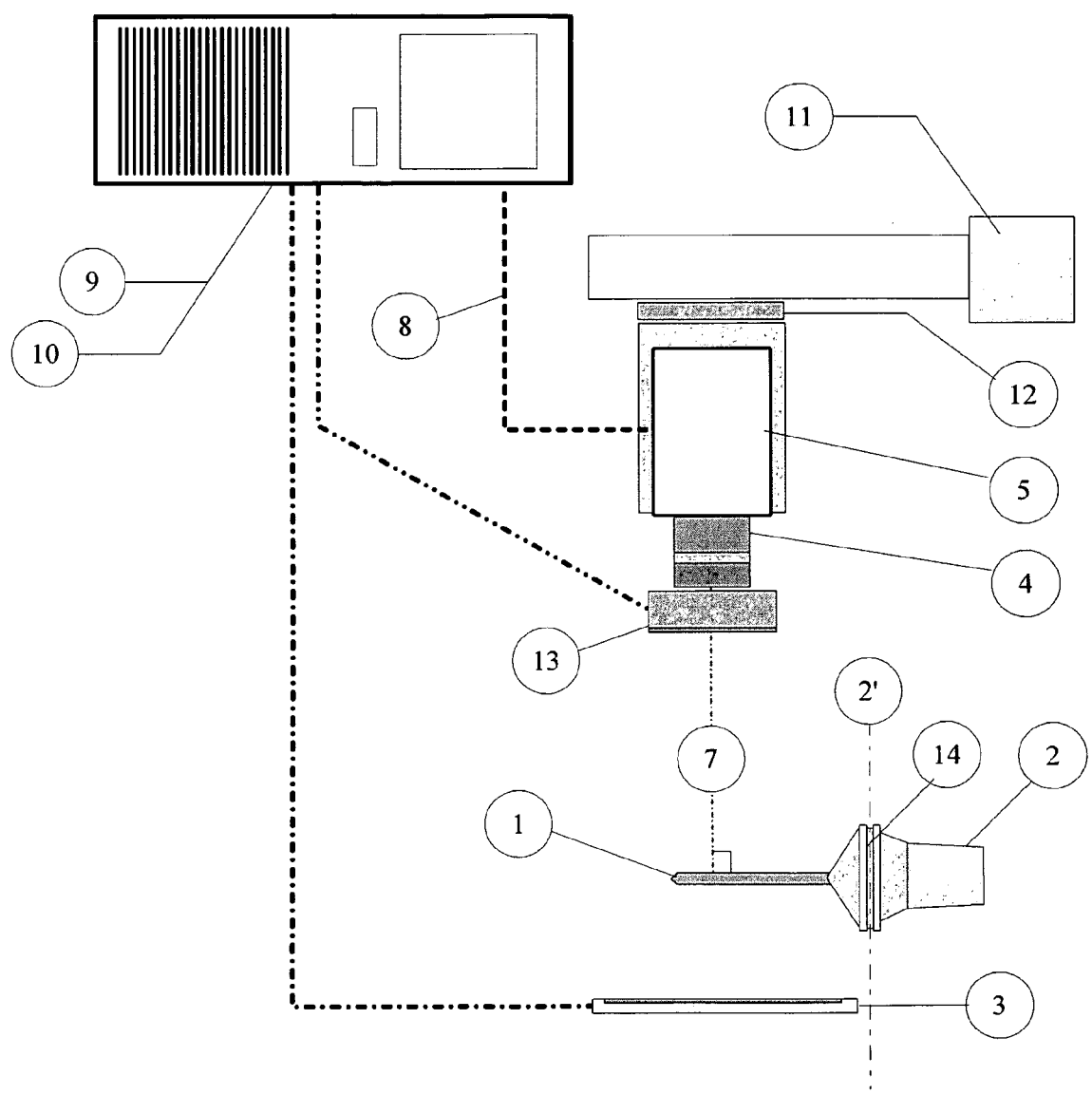
FIG. 2 illustrates the key components of the invention in a simple one sensor configuration using either an LED backlight and/or an LED ringlight for front illumination moving on a translation device to position the components above the region of interest.
Figure 3:
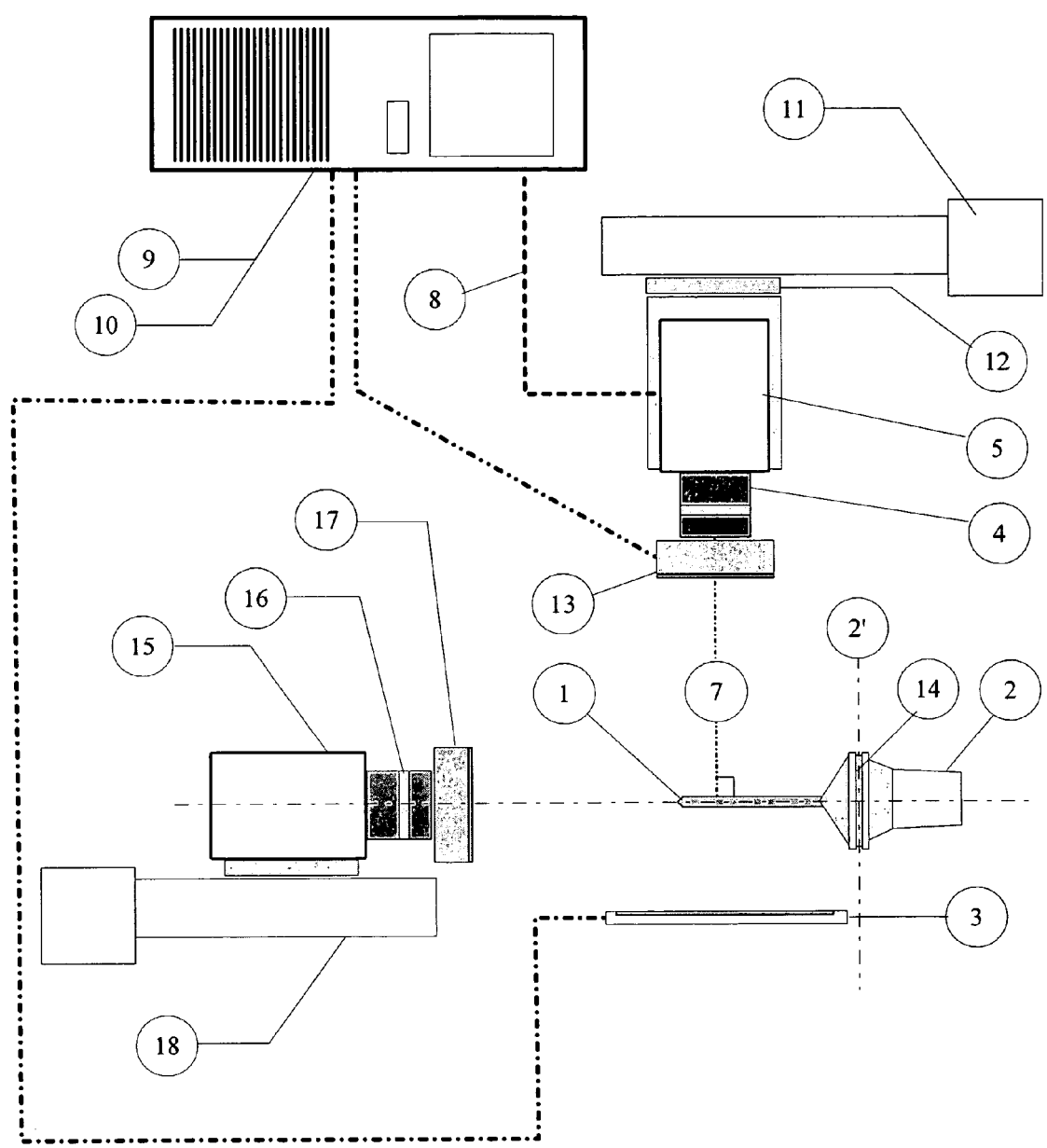
FIG. 3 illustrates the key components of the invention in a multiple sensor configuration that incorporates two sensors arranged orthogonal to each other, each with a independent linear translation device to position the sensor/lighting.

This invention has application in all high volume/high speed CNC machining centers with an automatic tool changer used in modern manufacturing facilities. The present invention is referred to as the Broken Tool Detection System (BTDS) and is designed for operation on the equipment of all major suppliers of CNC machining centers.

The basic BTDS is a combination of four key components configured in the proper way to determine if machining tools are physically damaged immediately after use and require replacement prior to continuing operation. The key components are an illumination module, one or more sensor module(s), and one or more image processing systems and application specific software used to determine the condition of the machining tools.

In its most primitive form, the BTDS will use a single sensor to determine the condition of a simple geometry tool, such as a drill, tap or reamer. The advantage that this system has over competitive technologies is that the condition of tool can be checked using more than one testing technique. Unlike existing technology that is used to check for broken tools the present invention examines multiple attributes to determine the quality of the tool. The BTDS deduces the tool condition based on several factors, including but not limited to, length, diameter, pitch of features, and shape of the tool. The criteria to determine the condition of the tools can be based on one or a combination of the factors.

The present invention claims the use of a unique set of "logic table rules" to determine the ultimate acceptability of the components being inspected. The logic table rules are constructed so that each inspection criteria has one or more factors compared to each using simple logical operations, i.e., AND, OR, NOT, etc. The logical value assigned to each inspection criteria is determined by setting tolerance ranges for measurements as "Acceptable" equal to one (1) and "Unacceptable or Defective" equal to zero (0). The "Overall Quality" of the component under inspection is determined by the resulting output of one or more logic tables.

In addition, the present invention can automatically select which set of inspections and logic tables should be applied based on the orientation of the machining tool being tested. The invention is capable of determining the orientation of the machining tool using one or more image sensors. Once the orientation of the machining tool is determined the image processing system will apply the proper set of logic tables. For example, the profile of a tap will appear different as the components rotational position is changed. Determination of the part orientation will reduce the overall cycle time of the inspection equipment by reducing the number of test and logic table rules that must be applied.

The BTDS can further be enhanced with the use of an infrared image sensor. The infrared image sensor will allow the BTDS to isolate broken or worn tools based on a temperature profile of the component after normal operation. After the completion of a machining operation an infrared image of the component is acquired. The infrared image is used to generate a temperature profile, if the profile falls outside an established tolerance range the component is suspect and flagged for replacement. The infrared image sensor is capable of detecting small changes in temperatures and will alert the user of potential tool, materials and process variation problems.

FIG. 1 illustrates the fundamental components of the basic invention, the Broken Tool Detection System (BTDS). Many of the components are used in all BTDS configurations. There are three principal system configurations with many variations within each possible. The most basic configuration is shown in FIG. 1 and uses a single image sensor to perform all inspections and evaluation of the criteria. All of the item numbers used in FIGS. 1 through 6 represent the same component or feature. Once an item number has been defined it may be used to clarify a component or feature in one or more figures.

The component to be inspected (item 1) is normally located in a collet (item 2). The tool is positioned in the collet with respect to the collet reference plane indicated in the figure as item 2'. The position of the tool is critical, any misplacement will result in features that are either too deep or too shallow in the workpiece, and this is especially true when the tool is an end mill. All measurements for tool placement in the collet are with respect to the reference plane (item 2'). The collet is positioned in either a tool holding area (rotating disk or movable chain) or in the tool changer arm. The tools are to be inspected immediately after use. In this condition the tools usually have cooling fluids and lubricate dripping from them. The illustrations show the orientation of the image sensor(s) and illumination system(s) with respect to the principle axis of the tool. It should be noted that sensors and illumination systems are hardened to meet the requirements of the environment, i.e. sealed housings. The orientation is such to minimize the degradation of equipment, i.e. to view from the side whenever possible.

The tool used for machining (item 1) is positioned within the field of view (FOV) of the lens (item 4)/image sensors (item 5) while being held in tool holder (item 2). The tool holder usually incorporates a tapered collet and can be positioned very accurately. When the tool holder is held in grip of the automatic tool changer the position of the collet is located off the reference plane. The basic BTDS implements a fixed position image sensor (item 5) and fixed focal length lens (item 4). The set of tools that can be inspected using this configuration usually have similar size and length permitting them to fit within the FOV of the image sensor. The focal length of the lens defines the standoff or working distance (item 7) of the system. The working distance can be adjusted as required by selecting the proper focal length lens.

The illumination system (item 3) is positioned on the opposite side of the tool from the image sensor, i.e. backlight illumination. This illumination scheme produces a silhouette of the tool. This allows the inspection system to determine characteristics such as the overall length, diameter, tip shape, length of mill face and the pitch of threads on taps. The BTDS can implement an auxiliary illumination system (item 6a & 6b) to provide front illumination. The high frequency illumination system typically has a separate power supply (item 6a) and a separate illumination source, the lamp (item 6b). The front illumination is required to identify surface imperfections; i.e. chipped or broken sections of tools not identified using only the backlight technique.

The image sensor transfers data to the image processor (item 9) via a high-speed video link (item 8). The high-speed video link can be one of several available formats, i.e. Fire-wire, Camera-Link, Digital, or analog EIA (RS-170). The image processor (item 9) and special image processing software (item 10) are used to analyze the image data. The image processing power required for the inspection task depends on the size of the images to be analyzed and the time between tool changes. The tool change operations are usually very long compared to the image acquisition/processing time. The specialized image processing software will determine if the cutting tool is acceptable for use before it will allow the next machining operation to proceed.

The second BTDS configuration (FIG. 2) is a more sophisticated configuration and provides a linear translator (item 11) to move the image sensor attached to a moveable stage/bracket (item 12). This configuration is required when the cutting tools used in the CNC machining center exhibit large variations in length. The BTDS would be instructed as to the location of the cutting tool's end point when they are initially loaded into the automatic tool changer. The linear translator will move the image sensor parallel to cutting tool axis and insure that the end point (tip of drill or tap) is positioned within the field of view.

The BTDS can also utilize an LED ringlight (item 13) for front lighting of the cutting tool in place of high frequency fluorescent lighting (item 6a & 6b). The LED Ringlight can be mounted inside of sealed enclosure to protect it from harsh environments such as cooling fluids and lubricants. Such lighting sources are commercially available from Phoenix Imaging, Livonia, Mich., see Series 4600 sealed ringlights. The sealed ringlight can be attached to the sealed camera enclosure with a seal between them to create and completely enclosed sensor/lighting system. The initial tool setup and measurement positions for the sensor FOV are referenced to the collet reference plane, which coincides with the collet's alignment rings (item 14). The alignment rings are precise machined and are self-centering.

The third BTDS configuration (FIG. 3) is incorporates two or more image sensors to view the cutting tool from orthogonal directions. The on-axis image sensor (item 15), lens (item 16) and illumination source (item 17) are usually mounted with an orientation to view down the principle axis of the cutting tool. When the configuration implements visible illumination technique the on-axis sensor will see a projection of the cutting tool tip, i.e., circular profile with the flutes generating edge shapes. When there are variations in the position of cutting tool tip the on-axis sensor will also require a linear translator (item 18) to position the sensor at the proper standoff to keep the image in focus.

It is a further object of the present invention that yet another pair of translation axis may be added to the on-axis sensor (item 15). The translation axis would be arranged orthogonal to each other and mounted on the on-axis translator (item 18) or the on-axis translator would be mounted on the orthogonal translator. This arrangement would allow the sensor of the present invention to move in plane perpendicular to principle axis of the cutting tool. This is of interest when the machining tool is a multiple cutter mill and the quality of the cutting edge must be inspected.

Figure 4:
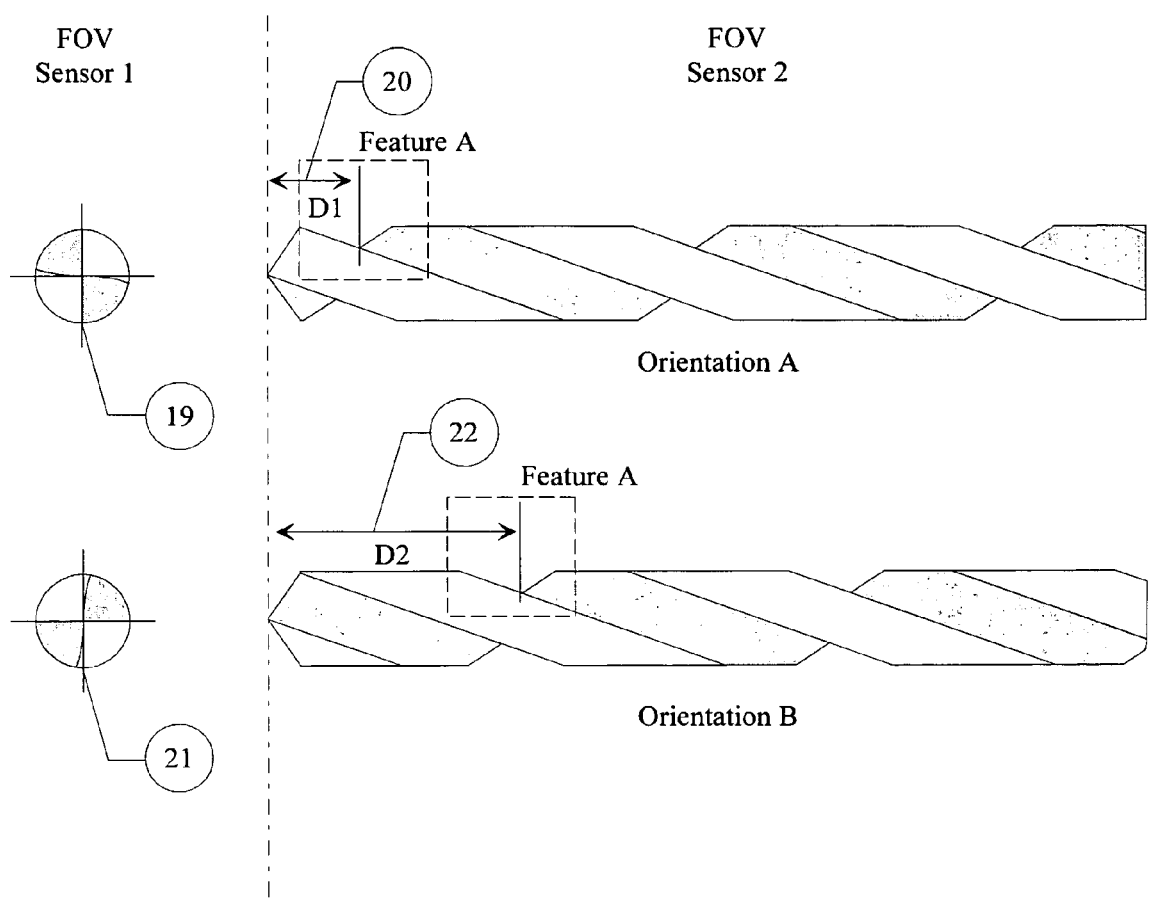
FIG. 4 illustrates the orientation and position of features on a sample test component.

FIG. 4 illustrates the variations in the orientation of the cutting tool when viewed from the various sensors. Item 19 illustrates the end view of a drill point as viewed looking down the principle axis of the tool. The orientation of the drill end will define where the features should be located when viewing the tool with an orthogonal sensor, as represented by the FOV of sensor 2. The distance of the first notch is measured with respect to the end of the drill. The position of the end of the drill is another measure that is easily obtained from this view. If the drill is not set to the proper depth it may cause damage to the workpiece by not producing the proper depth hole. This is also useful in the determination of tool wear by examining the end of tool after each subsequent operation the tool can be flagged for replacement as it reaches the end of useable range. When the tool orientation rotates in the collet, as represented by item 21, the location of the feature "A" from the end of tool will also change as is indicated by item 22.

FIG. 4 illustrates the location of the first notch isolated in the cutting tool profile at two different rotational orientations. In this example the end of the cutting tool is viewed in sensor 1 on the left and the sensor 2 on the right. The diagrams at the top represent orientation A and the diagrams on the bottom represent orientation B. In orientation A, the position of the notch from the tip of the tools is found at distance D1 (item 20). When the tool is rotated to orientation B, the position of the notch moves in the sensor FOV and measured at distance D2 (item 22). The BTDS will use several features on each component to construct the inspection data tables. The results of the inspection data tables will then be passed in the logic table to determine the usability of the component.

The other image sensor(s) will be mounted perpendicular to the on-axis image sensors. The on-axis sensor will determine the angular orientation of the cutting tool and instruct the perpendicular sensors on which inspection algorithm should be used for testing. As an alternative the angular orientation can be used to select the correct group of logic tables.

A further enhancement to this example would be the replacement of sensor (item 15, FIG. 3) with an infrared image sensor. The infrared image sensor could be used to determine orientation as would a visible wavelength image sensor but has the advantage in that it can be used to measure temperature. If the tool temperature in outside of the normal tolerance range it indicates that the tool may be worn or that the process parameters are not correct. For example, a tool that is cutting too fast or too slow will raise or lower the temperature of the cutting tool. The use of an infrared image sensor will also provide an indication as to the effectiveness of cooling fluid or lubricant use. If the cooling fluid or lubricant is not directed correctly at the cutting tool the temperature of the tool will rise and will reduce the life of the tool. This use of an infrared sensor to examine tool temperature may alone be justification the use of this technology.

Figure 5:
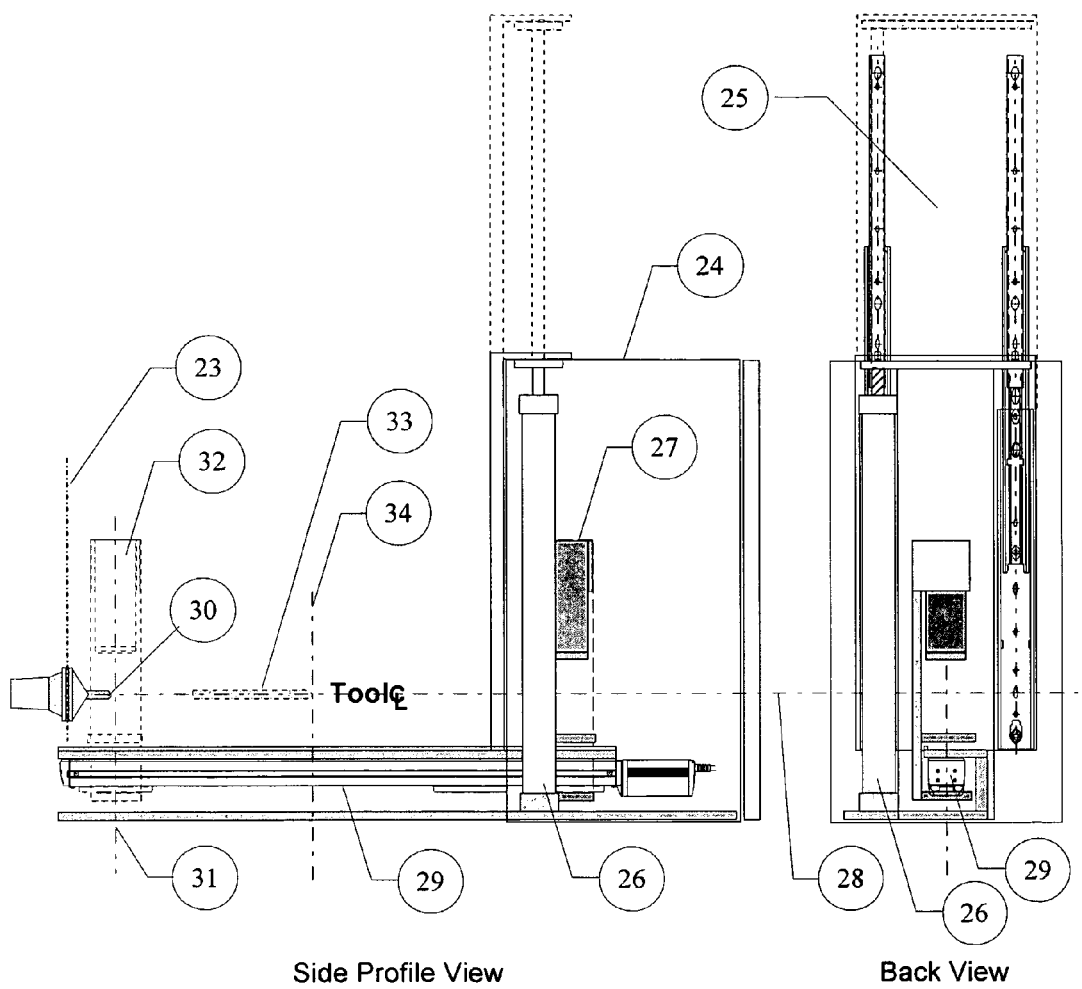
FIG. 5 illustrates the Rear and Side Profile of Broken Tool Detection System apparatus as used in the CNC machining center.

FIG. 5 illustrates the configuration of the present invention as used in the CNC machining center. The system must be protected from the harsh environment of the machining center and does so by moving the critical components into a protective enclosure (item 24). The enclosure has a moveable door (item 25) that operates vertically with the assistance of a pneumatic cylinder (item 26). The sensor module (item 27) is mounted on a vertical support that is sized to the diameter of tool(s) to be inspected. The components are held in this protective environment until the automatic tool changer is in a rest position (item 23) where the tool may be examined. At which time the sensor module moves out the enclosure parallel to the tool axis (item 28) via a linear translator (item 29). The sensor will move to the inspection position to view the tool tip (item 30) and will align the sensor's optical axis (item 32) to coincide with a preset translation position (item 31). If the tool is of a longer length (item 33) the same procedure is followed but the sensor will move to the corresponding measurement position (item 34).

The size of the enclosure will depend on the BTDS configuration. The component configuration will also vary based on the requirements of the tool inspection. FIG. 6 illustrates as similar system in this the tool position may vary in the vertical direction. The sensor module is then mounted on a perpendicular translation stage that allows the height to be adjusted as required.

What is claimed is:

1. An apparatus with protective environmental enclosure for measurement and determination of key characteristics of machine cutting tools used in a CNC machining center with a machine vision measuring system comprising:
   a) an image processing computer for image acquisition, image storage and image processing capability;
   b) the image processing computer comprising memory for storing images formed by a camera;
   c) the image processing computer also comprising digital parallel input/output, digital serial, and ethernet communication capabilities for providing messages to external devices to report one or more measurements or characteristics of the machine cutting tool;
   d) the image processing computer executing control software stored in a computer readable medium, for allowing request and response signals from external devices indicating a machine cutting tool to be inspected, for causing the image processing computer to perform image alignment and analysis for extraction of key characteristics of the machine cutting tool, as well as for causing the image processing computer to store a reference image of a new and unused machine cutting tool in a memory location referenced by a specific identification code that is unique to a specific machine cutting tool model or type, as well as causing a determination of the exact position of the machine cutting tool by extracting one or more edges or edge points based on grayscale sub-pixel information;
   e) a camera having one or more image sensors and a lens for providing a spatial resolution and depth of field necessary to form a sharp focus image of a machine cutting tool or a target portion thereof including the cutting tool tip;
   f) wherein each image sensor comprises sufficient pixel resolution to resolve an imperfection in a profile of the machine cutting tool or the target portion thereof including the cutting tool tip;
   g) an LED backlight illumination system positioned on the opposite side of the machine cutting tool from the camera that forms a silhouette of the machine cutting tool;
   h) a front lighting illumination system positioned on the same side of the machine cutting tool as the camera that highlights surface characteristics of the machine cutting tool;
   i) a motorized translation stage for moving the camera and the LED backlight and front lighting illumination systems parallel to an axis of rotation of the machine cutting tool and maintaining an orientation of an optical axis perpendicular to the axis of rotation of the machine cutting tool;
   j) a protective enclosure containing the camera image sensors, the lens, both the LED backlight and the front lighting illumination system, and the motorized translation stage inside when positioned in a rest position;

k) a moveable door on the protective enclosure with a pneumatic or electric cylinder to assist the opening and closing of the door;

l) a rear door with a liquid tight seal located opposite the moveable door that provides access to the camera image sensors, the lens, both the LED backlight and the front lighting illumination system, and the motorized translation stage when in the rest position;

m) an optical encoder for providing position information for ensuring that movement of the camera and the LED backlight and front lighting illumination systems reach a predetermined position where one or more images of the machine cutting tool are acquired;

n) whereby sensors are positioned relative to the tool, whereby a focal point of detection coincides with the center of a cross-sectional diameter so to view a feature to be measured, whereby the tool is held in a consistent location for each inspection, and whereby said LED backlight illumination system and said front lighting illumination system provide a contrasting geometric size and shape of all of the features on the tool.

2. An apparatus as recited in claim 1, wherein the executed control software provides for acquisition of a test image of new or used machine cutting tools and storage of the test image in memory and determining the exact position of a used machine cutting tool in the test image by extracting one or more edges based on grayscale image or grayscale sub-pixel information extracted from the grayscale image; alignment of a stored reference image of an unused machine cutting tool and the test image of the unused machine cutting tool by translation of the test image to coincide with edge points of a reference image; determining if a difference exists between the stored reference image of the machine cutting tool and the test image of the used machine cutting tool by means of a grayscale image subtraction and storing the result in a difference image; determining if the unused machine cutting tool being tested is out of position as determined by a shift in edge point information at the cutting tool tip; and generation of an error message to an external device indicating the isolation of a defective setup condition on the unused machine cutting tool tested.

3. An apparatus as recited in claim 1, wherein the executed control software provides for acquisition of a test image of a used machine cutting tool and storage of the test image in memory; determining the exact position of a used machine cutting tool in the test image by extracting one or more edges based on grayscale sub-pixel information; determining if a difference exists between the stored reference image of the unused machine cutting tool and the test image of the used machine cutting tool by means of a grayscale image subtraction and storing the result in a difference image in memory.

4. An apparatus as recited in claim 1, wherein the executed control software provides for acquisition of a test image of a used machine cutting tool and storage of the test image in memory; determining the exact position of the used machine cutting tool in the test image by extracting one or more edges based on grayscale sub-pixel information;

determining if a difference exists between the stored reference image of a machine cutting tool and the test image of the used machine cutting tool by means of a grayscale image subtraction and storing the result in a difference image; determining if the used machine cutting tool is worn by a decrease in overall length as determined by a shift in edge point information at the cutting tip, and generation of an error message to a external device indicating the isolation of a defective condition on the used machine cutting tool.

5. An apparatus as recited in claim 1, wherein the executed control software provides for acquisition of a test image of a used machine cutting tool and storage of the test image in memory; determining the exact position of a used machine cutting tool in the test image by extracting one or more edges based on grayscale image or grayscale sub-pixel information extracted from the grayscale image; alignment of a stored reference image of an unused machine cutting tool and the test image of the used machine cutting tool by translation of the test image to coincide with the edge points of the reference image; determining if a difference exists between the stored reference image of the machine cutting tool and the test image of the used machine cutting tool by means of a grayscale image subtraction and storing the result in a difference image; determining if the used machine cutting tool is worn by a change in the tool shape as determined by residual grayscale information in the difference image larger than a maximum number of pixels, and generation of an error message to a external device indicating a defective condition has been isolated on the used machine cutting tool.

6. A method for measurement and determination of key characteristics of machine cutting tools used in a CNC machining center, the method utilizing a machine vision measuring system and a computer comprising memory for executing control software embodied on a computer readable medium, to provide the steps of:

a) storing a reference image of a new unused machine cutting tool in a memory location referenced by a specific identification code that is unique to a machine cutting tool model or type;

b) determining a position of the machine cutting tool in the reference image by extracting one or more edges or edge points based on a grayscale image or sub-pixel information in the grayscale image and storing the corresponding pixel locations;

c) determining a portion of the reference image that contains reference foreground grayscale image information that represents the machine cutting tool;

d) determining the portion of the reference image that contains reference background information that excludes the machine cutting tool;

e) acquisition of a test image of a used machine cutting tool and storage of the test image in memory;

f) determining the position of the machine cutting tool in the test image by extracting one or more edges or edge points based on the grayscale image or sub-pixel information in the grayscale image and storing the corresponding pixel locations in memory;

g) determining the portion of the test image that contains the test foreground grayscale image information that represents the machine cutting tool;

h) determining the portion of the test image that contains the test background grayscale image information that excludes the machine cutting tool;

i) creation of a background difference image by grayscale subtraction of the test background image from the reference background image;

j) creation of a foreground difference image by grayscale subtraction of the test foreground image from the reference foreground image;

k) creating and storing in memory a background list of values comprising background grayscale objects representing resulting information in the background difference image larger than a pre-determined criteria;

l) creating and storing a foreground list of values comprising foreground grayscale objects representing resulting information in the foreground difference image larger than a pre-determined criteria;

m) reduction of the stored background list by applying pre-determined size and shape filtering algorithms;

n) reduction of the stored foreground list by applying pre-determined size and shape filtering algorithms;

o) and generating an error message prompting a user that the cutting tool is broken or worn and requesting replacement of the machine cutting tool when more than a pre-determined number of values remain on the stored background and foreground lists after filtering.

7. A method as recited in claim 6, further comprising the steps of: determining the size of a grayscale object in the foreground difference image in pixels; determining the size of the grayscale object is larger than a pre-determined criteria; and generating an error message that prompts the user that the cutting tool is broken and requests replacement of the cutting tool.

8. A method as recited in claim 6, further comprising the steps of: determining the size of a foreground grayscale object in the foreground difference image in pixels;

determining the size of the foreground grayscale object is smaller than a first pre-determined criteria and larger than a second pre-determined criteria; generating an error message that prompts a user that the cutting tool is worn and requesting replacement of the cutting tool in a pre-determined number of available machine cycles; receiving user input and in response, counting down the number of remaining available machine cycles, decrementing once each cycle; and when the available machine cycles reach zero generating error message to a user prompting the replacement of the cutting tool.

9. A method as recited in claim 6, further comprising the steps of determining the size of a foreground grayscale object in the foreground difference image in pixels; determining the size of the foreground grayscale object is smaller than a first pre-determined criteria; performing an alignment of the foreground test image to the foreground reference image; performing a second grayscale subtraction of an aligned foreground test image from the foreground reference image to create an aligned foreground difference image; determining the size of the foreground grayscale object in the aligned foreground difference image in pixels; determining the size of the foreground grayscale object is smaller than a second pre-determined criteria; generating an error message that prompts a user that the cutting tool is worn and requesting replacement of the cutting tool in a pre-determined number of available machine cycles; receive user input and in response, counting down the number of remaining available machine cycles, decrementing once each cycle; and when the available machine cycles reaches zero generating an error message to a user prompting the replacement of the cutting tool.

10. A method as recited in claim 6, further comprising the steps of: determining the size of a background grayscale object in the background difference image in pixels that is outside a region of the machine cutting tool; determining the size of the background grayscale object is larger than a pre-determined criteria; and generating an error message that prompts the user that a backlight is not functional and should be checked for operation.

11. A method as recited in claim 6, further comprising the steps of: determining the size of a background grayscale object in the background difference image in pixels that is outside region of the machine cutting tool; determining the size of the background grayscale object is smaller than a first pre-determined criteria and larger than a second pre-determined criteria; and generating an error message that prompts the user that a backlight is dirty and requires cleaning.

* * * * *